United States Patent [19]
Funakoshi et al.

[11] Patent Number: 5,703,196
[45] Date of Patent: Dec. 30, 1997

[54] PROCESS FOR PRODUCING POLYCARBONATE HAVING TERMINAL HYDROXYL GROUPS

[75] Inventors: Shinji Funakoshi, Kawasaki; Kenzou Kawai, Yokohama, both of Japan

[73] Assignee: Asahi Kasei Kogyo Kabushiki Kaisha, Osaka, Japan

[21] Appl. No.: 718,514

[22] PCT Filed: Apr. 7, 1995

[86] PCT No.: PCT/JP95/00687

§ 371 Date: Oct. 8, 1996

§ 102(e) Date: Oct. 8, 1996

[87] PCT Pub. No.: WO95/27749

PCT Pub. Date: Oct. 19, 1995

[30] Foreign Application Priority Data

Apr. 8, 1994 [JP] Japan ................................. 6-071045

[51] Int. Cl.$^6$ .................................................. C08G 64/00
[52] U.S. Cl. ........................... 528/196; 528/198; 528/370
[58] Field of Search ........................ 528/196, 198, 528/370

[56] References Cited

U.S. PATENT DOCUMENTS

| | | | |
|---|---|---|---|
| 4,131,731 | 12/1978 | Lai et al. | 528/370 |
| 4,978,691 | 12/1990 | Murai et al. | 521/172 |
| 5,322,919 | 6/1994 | Kurosawa et al. | 528/198 |

FOREIGN PATENT DOCUMENTS

| | | | |
|---|---|---|---|
| 51-144492 | 12/1976 | Japan | C08G 63/62 |
| 55-56124 | 4/1980 | Japan | C08G 63/62 |
| 63-12896 | 3/1988 | Japan | C08G 63/62 |
| 3-199230 | 12/1989 | Japan . | |
| 2-284919 | 11/1990 | Japan | C08G 64/30 |
| 4-153218 | 5/1992 | Japan | C08G 64/30 |
| 4-293024 | 8/1992 | Japan | C08G 64/30 |
| 6-21160 | 3/1994 | Japan | C08G 63/62 |
| 6-145336 | 5/1994 | Japan | C08G 18/32 |
| 6-206964 | 7/1994 | Japan | C08G 18/32 |

*Primary Examiner*—Terressa Mosley
*Attorney, Agent, or Firm*—Jacobson, Price, Holman & Stern, PLLC

[57] ABSTRACT

A process for producing a polycarbonate having terminal hydroxyl groups obtained by reacting an aliphatic polyol with a carbonate monomer, characterized by comprising the first step of producing a low molecular weight polycarbonate while removing the alcohols produced as by-products from the reaction mixture containing the aliphatic polyol and the carbonate monomer and the second step of adding to the reaction mixture the carbonate monomer in portions or continuously under the conditions that the concentration of the aliphatic polyol in the reaction mixture in the first step is 5% by weight or less and effecting the reaction while removing the alcohols produced as by-products, whereby connecting the low molecular weight polycarbonates to one another through the carbonate monomer to heighten the molecular weight.

18 Claims, No Drawings

PROCESS FOR PRODUCING POLYCARBONATE HAVING TERMINAL HYDROXYL GROUPS

[TECHNICAL FIELD]

This invention relates to a process for producing a polycarbonate having terminal hydroxyl groups useful as a starting material for polyurethane in an emulsion, a coating, a thermoplastic elastomer, a paint, an adhesive or the like.

[BACKGROUND ART]

As the process for producing a polycarbonate having terminal hydroxyl groups, there is a process which comprises subjecting a carbonate monomer along with a divalent alcohol monomer to interesterification to obtain a low molecular weight polycarbonate and then self-condensing this to obtain a high molecular weight polycarbonate as disclosed in JP-B-63-12,896 (corresponding to U.S. Pat. No. 4,131,731). In this process, self-condensation is effected in the latter half of the process, so that the amount of the divalent alcohol monomer distilled out becomes large, and therefore, the yield of polycarbonate is low and it is necessary to apply severe conditions of high temperature and high vacuum over a long period of time. When a product is exposed to a high temperature for a long period of time, the coloration of the product is feared, and decomposition of product becomes easy to cause. Therefore, in order to keep a high vacuum under such conditions, a cooling trap having a higher performance and a vacuum pump of a larger size become necessary. Under such circumstances, there has been desired a development of a process for producing a polycarbonate more economically without applying severe conditions of high temperature and high vacuum over a long period of time.

In particular, when a butanediol type polycarbonate is produced using 1,4-butanediol as the divalent alcohol monomer according to the above-mentioned prior art, there have been such problems that tetrahydrofuran is easily produced as a by-product by reaction of the carbonate monomer with the butanediol and/or decomposition of the 1,4-butanediol residue terminals of the polycarbonate produced and that in the step of self-condensation requiring the application of severe conditions of high temperature and high vacuum, the reaction under reduced pressure becomes difficult because of the large amount of hydrofuran produced as a by-product and the molecular weight does not become high. Moreover, since it is difficult to completely trap the tetrahydrofuran in the vacuum system using a cooling trap, an equipment such as an absorption tower or the like becomes necessary for lowering the concentration of the tetrahydrofuran discharged into the atmosphere through the vacuum pump and the commercial scale production of a high molecular weight butanediol type polycarbonate has been difficult.

However, 1,4-butanediol is very inexpensive and hence a butanediol type polycarbonate produced using the same can become very inexpensive. In addition, it is clear that a polyurethane obtained using a low molecular weight butanediol type polycarbonate is superior in chemical resistance to other polyurethanes obtained using other polyols; however, even when the low molecular weight butanediol type polycarbonate is used, for example, as the soft segment of a polyurethane, the proportion of the hard segment becomes high and no urethane having soft and good feeling is obtained. Therefore, the low molecular weight butanediol type polycarbonate has not been so often used as the starting material for polyurethane.

Under such circumstances, a development of a process for producing a high molecular weight butanediol type polycarbonate has been desired.

In JP-A-4-153,218, a process is proposed which comprises subjecting a carbonate monomer and a divalent alcohol monomer to interesterification, to obtain a low molecular weight polycarbonate, then adding thereto a carbonate monomer and further subjecting the resulting mixture to interesterification reaction to heighten the molecular weight. This process is effective for heightening the conversion of the dihydric alcohol monomer to increase the one batch yield; however, the reaction for heightening the molecular weight is not fast, and the production of polycarbonate per unit volume per unit time is small. In addition, the polycarbonate monomer is added in one portion and hence the rake of increasing the molecular weight is lowered as the reaction proceeds and the molecular weight increases. Therefore, the self-condensation reaction must be carried out when it is intended to produce the high molecular weight polycarbonate more economically. In this case, the same problem has occurred as stated about the self-condensation reaction in JP-B-63-12,896 (corresponding to U.S. Pat. No. 4,131,731). Under such circumstances, a development of a process for more economically producing a high molecular weight polycarbonate has been desired.

[DISCLOSURE OF THE INVENTION]

This invention solves the problems of the above-mentioned prior art and aims at providing a process for more economically producing a polycarbonate in an increased production per unit volume per unit time without applying severe conditions of high temperature and high vacuum over a long period of time and also a process for commercially advantageously producing a high molecular weight butanediol type polycarbonate useful as a starting material for polyurethane.

The present inventors have made extensive study in view of such circumstances and have consequently found that by adding continuously or in portions a carbonate monomer in the stage in which a low molecular weight polycarbonate has been produced and under the conditions that the concentration of an aliphatic polyol in the reaction system is 5% by weight or less and under reduced pressure, the molecular weight of a polycarbonate having terminal hydroxyl groups can be heightened in a surprisingly short time without using such high temperature conditions as in the self-condensation of the above-mentioned prior art; the production per unit volume per unit time is increased; and the production process can be made excellent industrially and economically. The present inventors have completed this invention based on the above knowledge.

Furthermore, by using the production process of this invention, the commercial scale production of a high molecular weight butanediol type polycarbonate having excellent physical properties at a very low cost with a good efficiency is easily made possible, and this invention has a very great economical effect.

[BEST MODE FOR CARRYING OUT THE INVENTION]

That is to say, this invention is a process for producing a polycarbonate having terminal hydroxyl groups obtained by reacting an aliphatic polyol with a carbonate monomer selected from the group consisting of a dialkyl carbonate, a diaryl carbonate and an alkylene carbonate, characterized by comprising the first step in which a low molecular weight polycarbonate is produced while removing the alcohols produced as by-products from a reaction mixture containing the aliphatic polyol and the carbonate monomer and the second step in which the carbonate monomer is added in portions or continuously to the reaction mixture of the first step under the conditions that the concentration of the aliphatic polyol in the reaction mixture of the first step is 5% by weight or less to effect the reaction while removing the alcohols produced as by-products, thereby connecting the low molecular weight polycarbonates to one another through the carbonate monomer to heighten the molecular weight.

This invention is explained in detail below.

The polycarbonate monomer used in this invention is selected from the group consisting of a dialkyl carbonate, a diaryl carbonate and an alkylene carbonate. As the dialkyl carbonate, there are mentioned those whose alkyl group has 1 to 12 carbon atoms, and specifically mentioned are dimethyl carbonate, diethyl carbonate, dibutyl carbonate and the like. As the diaryl carbonate, there are mentioned those whose aryl group has 6 to 20 carbon atoms, and specifically mentioned are diphenyl carbonate, dinaphthyl carbonate and the like. The alkylene carbonate comprises a 5-membered to 7-membered ring, and specifically includes ethylene carbonate, propylene carbonate and the like. These carbonate monomers are used alone or in combination of two or more.

The aliphatic polyol used in this invention (referred to hereinafter as the polyol monomer) is preferably a dihydric alcohol (diol), and in many cases, it is selected from an alkylene glycol and a polyoxyalkylene glycol. However, particularly preferable are alkylene glycols whose main chain has 3 to 20 carbon atoms and polyoxyalkylene glycols in which the number of carbon atoms between oxygen atoms is 2 to 12. The alkylene referred to herein may contain a group derived from an alicyclic compound. These dihydric alcohol monomers are used alone or in combination of two or more.

Examples of the dihydric alcohol monomers include ethylene glycol, 1,3-propanediol, 1,4-butanediol, 1,5-pentanediol, 3-methyl-1,5-pentanediol, 1,6-hexanediol, 1,5-hexanediol, 1,7-heptanediol, 1,8-octanediol, 1,9-nonanediol, 1,10-decanediol, 1,11-undecanediol, 1,12-dodecanediol, neopentyl glycol, 2-ethyl-1,6-hexanediol, 2-methyl-1,3-propanediol, 1,3-cyclohexanediol, 1,4-cyclohexanediol, 2,2'-bis(4-hydroxycyclohexyl)propane, 1,4-dimethylolcyclohexane bishydroxytetrahydrofuran, di(2-hydroxyethyl)dimethylhydantoin, diethylene glycol, triethylene glycol, polypropylene glycol, polytetramethylene glycol, 6-hydroxyethylhexanol, 5-hydroxyethylpentanol and the like.

These dihydric alcohol monomers may be used in admixture with a trifunctional or more functional hydroxyl compound (trihydric alcohol). Examples of this trihydric alcohol include trimethylolethane, trimethylolpropane, hexanetriol, pentaerythritol and the like. It may also be used in admixture with such a polyol as a polyesterpolyol or the like.

The main reaction in the first step in this invention is an interesterification reaction between the polyol monomer and the carbonate monomer and, for example, when a dihydric alcohol monomer is used as the polyol monomer, the above reaction is shown by the following scheme (1) or (2):

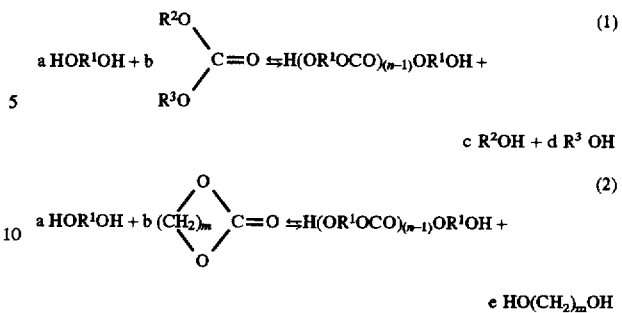

wherein $R^1$ represents an alkylene glycol residue having 3 to 20 carbon atoms or a polyoxyalkylene glycol residue in which the number of carbon atoms between oxygen atoms is 2 to 12;

$R^2$ and $R^3$ represent alkyl groups having 1 to 12 carbon atoms or aryl groups having 6 to 20 carbon atoms; and a, b, c, d and e are constants determined stoichiometrically;

m is a natural number of 2 to 4; and n is a natural number of 2 or more.

Since said reaction is an equilibrium reaction, it is necessary to remove the alcohol produced as a by-product from the reaction system in order to allow the reaction to proceed with a good efficiency. In order to selectively remove only the alcohol produced as a by-product, it is desirable that the reaction is effected in a reactor equipped with a distillation tower.

The reaction temperature in the first step is 80° to 200° C. At a temperature of not less than 200° C., the decomposition reaction of a polycarbonate having terminal hydroxyl groups is easily caused and at a temperature of not more than 80° C., the interesterification reaction is slow. The pressure is gradually reduced between atmospheric pressure and 6.7× $10^2$ Pa (5 mmHg) for securing the amount of the distillate.

The first step is completed when the conversion of the polyol monomer reaches 40 to 90 mole %; however, the conversion is preferably determined taking economization into consideration. For example, when the production is effected continuously, it is preferable to complete the first step when the conversion at which the production per unit volume per unit time in the overall process becomes the maximum is reached. The polycarbonate having terminal hydroxyl groups obtained at the time of completion of the first step is a low molecular weight polymer having a degree of polymerization of about 2 to 10. The degree of polymerization referred to herein is n stated in the above schemes (1) and (2). The molecular weight of the low molecular weight polycarbonate obtained in the first step can be adjusted by the amount of the by-product alcohol removed from the reaction system, and it is also possible to adjust the same by the feed ratio of the carbonate monomer and the polyol monomer. Usually, the carbonate monomer:polyol monomer feed ratio is selected from the range of from 1:10 to 10:1, preferably from the range of from 1:2 to 2:1. When the ratio is outside the range of from 1:10 to 10:1, the yield is extremely lowered and economically disadvantageous. In many cases, the economically excellent reaction conditions are obtained in the range of from 1:2 to 2:1.

In the second step, first, in order to adjust the polyol monomer concentration in the reaction mixture obtained in the first step to 5% by weight or less, preferably 1% by weight or less, the polyol monomer is, if necessary, removed from the reaction system. When the polyol monomer concentration exceeds 5% by weight, no quick increase of the molecular weight of the low molecular weight polycarbonate is recognized at the time of addition of the polycarbonate monomer, and only under the conditions that the concentration is 5% by weight or less, the molecular weight is quickly increased. In particular, under the conditions that the concentration is 1% by weight or less, the rate of increase of the molecular weight is remarkably heightened.

As the method of removing the polyol monomer, a method by which the pressure is lowered to a reduced pressure of 13 Pa to $2.7 \times 10^4$ Pa (0.1 mmHg to 200 mmHg), preferably 13 Pa to $2.7 \times 10^3$ Pa (0.1 mmHg to 20 mmHg), a method by which the temperature is elevated to 100° to 200° C., a method by which an inert gas such as nitrogen gas or the like is blown, and other methods, which are generally employed, are used alone or in combination of plural methods.

Subsequently, the polycarbonate monomer is added to this reaction system to connect the low molecular weight polycarbonates produced in the first step to one another through the carbonate monomer, whereby the molecular weight is efficiently heightened. In this step, the main reaction is shown by the following schemes (3) and (4):

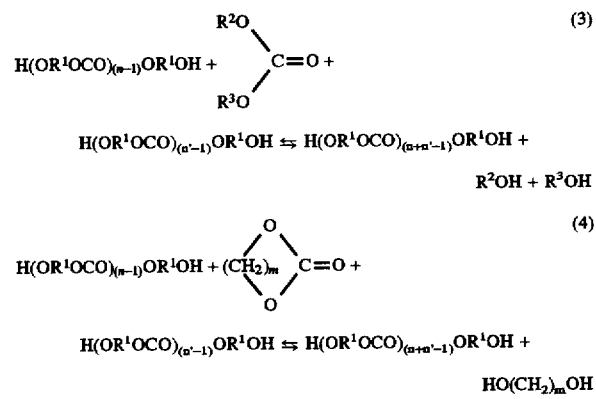

wherein

- $R^1$ represents an alkylene glycol residue having 3 to 20 carbon atoms or a polyoxyalkylene glycol residue in which the number of carbon atoms between oxygen atoms is 2 to 12;
- $R^2$ and $R^3$ represent alkyl groups having 1 to 12 carbon atoms or aryl groups having 6 to 20 carbon atoms;
- m is a natural number of 2 to 4; and
- n and n' are natural numbers of 2 or more.

Incidentally, for comparison, the main reaction in the step of heightening the molecular weight in JP-B-63-12,896 (corresponding to U.S. Pat. No. 4,131,731) is shown by the scheme (5). That is, the technique of the above JP-B-63-12,896 is to obtain a high molecular weight carbonate by self-condensation reaction of low molecular weight polycarbonates with one another, while in the process of this invention, the molecular weight is heightened by connecting the low molecular weight polycarbonates to one another by interesterification reaction through the carbonate monomer, and in this respect, the process of this invention and the technique of JP-B-63-12,896 are essentially different from each other.

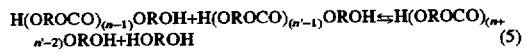

wherein

R represents an alkylene glycol residue having 3 to 20 carbon atoms or a polyoxyalkylene glycol residue in which the number of carbon atoms between oxygen atoms is 2 to 12 and n and n' are natural numbers of 2 or more.

When an alkylene carbonate is used as the carbonate monomer in the method of JP-A-4-153,218, the main reaction in the step of heightening the molecular weight is shown by the scheme (6) and the scheme (7). However, since the carbonate monomer is added without controlling the polyol monomer concentration, the interesterification reaction with the polyol monomer represented by the scheme (6) is mainly caused, the yield is higher than that in the process of this invention, but a longer time is required for heightening the molecular weight of the polycarbonate and the production per unit volume per unit time is inferior to that in the process of this invention. That is to say, since in the process of this invention, the concentration of the polyol monomer is controlled in the step of heightening the molecular weight, the ratio of the reaction of the scheme (7) to the reaction of the scheme (6) is much larger than that in the process of JP-A-4-153,218 and the scheme (7) is the main reaction. Thus, the process of this invention is greatly different from the process of JP-A-4-153,218.

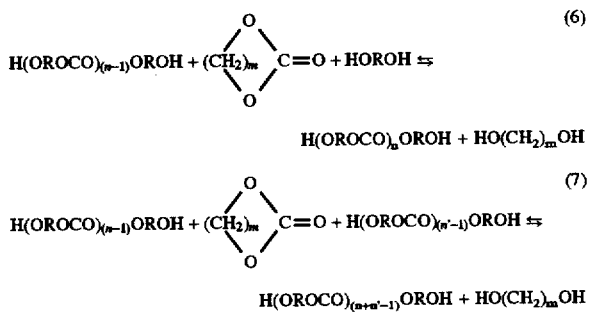

wherein

- R represents an alkylene glycol residue having 3 to 20 carbon atoms or a polyoxyalkylene glycol residue in which the number of carbon atoms between oxygen atoms is 2 to 12;
- a, b and c are constants which are stoichiometrically determined;
- m is a natural number of 2 to 4; and
- n and n' are natural numbers of 2 or more.

The temperature for effecting the interesterification reaction in the second step is 100° to 200° C., and the pressure is 13 Pa to $2.7 \times 10^4$ Pa (0.1 mmHg to 200 mm Hg), preferably 13 Pa to $2.7 \times 10^3$ Pa (0.1 mmHg to 20 mm Hg). In order to allow these reactions to proceed quickly, the alcohols produced as by-products are required to be taken out of the reaction system. Therefore, in this step, it is preferable to directly evacuate vapor without through a distillation tower for taking out the alcohol produced as a by-product of the reaction system with a good efficiency. For this purpose, the use of a thin film evaporator is also effective. In addition, in order to take out the alcohol produced as a by-product of the reaction system with a good efficiency, it is effective that such methods as elevating the temperature, lowering the pressure and blowing an inert gas such as nitrogen gas or the like are carried out alone or in combination of plural methods in association with the heightening of the molecular weight of the polycarbonate. It is advantageous in process that the unreacted monomer distilled out in this step is recovered and then re-used.

Under said conditions, the unreacted carbonate monomer is distilled out in a large amount and the concentration of the carbonate monomer in the reaction system at this time becomes a value as low as 0.1% by weight to 5% by weight; however, surprisingly, it has become clear that the heightening of the molecular weight of the polycarbonate proceeds in a relatively short time in spite of the fact that the concentration of the carbonate monomer is thus low. This is considered to be because the proceeding of the reactions of the formula (3) and the formula (4) depends more greatly on the concentration of the alcohol produced as a by-product rather than on the concentration of the carbonate monomer though this has not been expected at the beginning.

That is to say, the technical point of the second step is to add the carbonate monomer under such conditions that the polyol monomer concentration is 5% by weight or less and that the concentration of the alcohol produced as a by-product can be controlled to a low value. The concentration of the alcohol produced as a by-product in this reaction system is required to be made lower when the molecular weight of the polycarbonate is higher. Also, slightly depending upon the kind of the carbonate monomer, the concentration of the alcohol produced as a by-product in the reaction system need be made lower when a carbonate monomer whose equilibrium constants of the reactions shown in the above formulas (3) and (4) are small is used.

The addition of the carbonate monomer is effected in portions or continuously; however, the continuous addition is preferred in that the heightening of the molecular weight can be achieved in a relatively small addition amount. When the carbonate monomer is added in one portion as in the method of JP-A-4-153,218, it is difficult to quickly heighten the molecular weight. In the process of this invention, when the addition in portions is effected, it is preferable to add a uniform amount of the polycarbonate monomer at a uniform interval from the start of addition to obtaining a polycarbonate having the desired molecular weight; however, the amount of the carbonate monomer added in the former half or latter half of or during the above period may be increased or the carbonate monomer may be added at uneven intervals. Also, when the continuous addition is effected, it is also preferable to add the carbonate monomer at a constant flow rate from the start of addition to obtaining a polycarbonate having the desired molecular weight; however, the flow rate of the carbonate monomer added in the former half or latter half of or during the above period may be increased.

Moreover, the total amount of the carbonate monomer added is controlled so that the amount of the carbonate monomer recovered in all the steps becomes not more than the amount of the carbonate monomer converted in one batch, and it is advantageous in process that the carbonate monomer recovered is recycled to be used as the feed in the subsequent reaction.

In addition, the carbonate monomer added may be the same as or different from that charged in the initial stage of the reaction. Further, the said carbonate monomers may be added alone or in combination of plural kinds.

In this invention, the reaction proceeds in the absence of a catalyst; however, it is possible to use a catalyst. As the catalyst, a known interesterification catalyst is added in an amount of 0.0001% by weight to 3% by weight based on the starting material fed. Examples of the known interesterification catalyst include titanium alkoxides such as titanium tetrapropoxide, titanium tetrabutoxide and the like; metals such as sodium, potassium, lithium, rubidium, cesium, magnesium, calcium, strontium, barium, aluminum, cobalt, germanium, cerium, manganese, lead, antimony, tin, zinc and the like; salts thereof; oxides thereof; complexes thereof; alkoxides thereof; inorganic acids, organic acids; inorganic alkalis; organic alkalis and the like.

At the time of completion of the second step, it is possible to stop the addition of the carbonate monomer and continue the reaction under conditions as they are to allow all the remaining carbonate monomer to react. It is also possible to carry out such methods as elevating the temperature, lowering the pressure, blowing a nitrogen gas or the like, etc. alone or in combination of plural methods to remove the remaining carbonate monomer with a good efficiency, thereby shortening the reaction time.

Japanese Patent Application No. 6-071,045 upon which the present application relies for Convention Priority is wholly incorporated into the present specification by reference.

Examples are shown below to explain this invention in detail; however, these do not restrict the scope of this invention at all.

EXAMPLE 1

In a 3-liter reactor equipped with a stirrer, a thermometer and a fractionating column were placed 1,584 g (18 moles) of ethylene carbonate, 1,440 g (16 moles) of 1,4-butanediol and 30 mg of lead acetate and they were subjected to reaction at a temperature of 130° C. at a pressure of $2.3 \times 10^3$ Pa to $4.7 \times 10^3$ Pa (17 mmHg to 35 mmHg) for 10 hours. In this case, the ethylene glycol produced as a by-product and unreacted ethylene carbonate were distilled out of the top of the fractionating column, and in the cold trap, it was found that 2.5 mole % based on the 1,4-butanediol fed of tetrahydrofuran (referred to hereinafter as THF) was produced. The number average molecular weight of the product in the reactor at this time was measured by GPC to find it to be about 400. Subsequently, the pressure was returned to normal pressure, the fractionating column was removed to make direct evacuation possible, and thereafter, the temperature was adjusted to 140° C., at which unreacted diol was taken out at a pressure of $5.3 \times 10^2$ Pa to $8.0 \times 10^2$ Pa (4 mmHg to 6 mmHg) for one hour until the diol concentration in the reaction system became 3% by weight. Subsequently, the temperature was adjusted to 140° C. to 150° C., at which ethylene carbonate was continuously added to the reaction system at a rate of 100 g per hour at a pressure of $5.3 \times 10^2$ Pa to $1.3 \times 10^3$ Pa (4 mmHg to 10 mmHg) for 4 hours and subjected to reaction. In this case, the ethylene glycol produced as a by-product was distilled out together with unreacted ethylene carbonate. The concentration of the ethylene glycol produced as a by-product in the reaction system during the reaction was 0.05% by weight or less and the concentration of the ethylene carbonate was 1% by weight to 0.6% by weight. In the cold trap, THF was produced in an amount of 1.5 mole % based on the 1,4-butanediol fed. At this time, in the reactor, 1,302 g of polytetramethylene carbonate diol was produced, and the number average molecular weight thereof was 2,020 (hydroxyl value=55.5 mg·KOH/g). As a result of analysis, the ether linkage unit component resulting from the decomposition of the ethylene carbonate (referred to hereinafter as the ether unit) was contained in a proportion of 0.8 mole % in the polytetramethylene carbonate diol produced. The total amount of THF produced as a by-product from the initial stage of the reaction was 4 mole % based on the 1,4-butanediol fed. The reaction time required from the start of reaction to the completion of this step was 15 hours. Subsequently, 200 g of the polytetramethylene carbonate diol obtained was placed in a 500-ml egg plant type flask and the residual monomer was removed in a film evaporator at a temperature of 140° C. at a pressure of 267 Pa (2 mmHg) for one hour to obtain 195 g of polytetramethylene carbonate diol having a number average molecular weight of 2,035 (hydroxyl value=55.1 mg·KOH/g).

EXAMPLE 2

In a 3-liter reactor equipped with a stirrer, a thermometer and a fractionating column were placed 1,397 g (15.9 moles) of ethylene carbonate, 751 g (7.2 moles) of 1,5-pentanediol, 852 g (7.2 moles) of 1,6-hexanediol and 30 mg of lead acetate and they were subjected to reaction at a temperature of 150° C. at a pressure of $2.7\times10^3$ Pa to $6.0\times10^3$ Pa (20 mmHg to 45 mmHg) for 7 hours. In this case, the ethylene glycol produced as a by-product and unreacted ethylene carbonate were distilled out of the top of the fractionating column. The number average molecular weight of the product in the reactor at this time was measured by GPC to find it to be about 450. Subsequently, the pressure was returned to normal pressure, the fractionating column was removed to make direct evacuation possible, and thereafter, the temperature was adjusted to 150° C., at which unreacted diol was taken out at a pressure of $5.3\times10^2$ Pa to $1.3\times10^3$ Pa (4 mmHg to 10 mmHg) for one hour until the diol concentration in the reaction system became 1.6% by weight. Subsequently, at a temperature of 150° C. at a pressure of $5.3\times10^2$ Pa to $1.6\times10^3$ Pa (4 mmHg to 12 mmHg), 300 g of ethylene carbonate was added in portions in a proportion of 300 g per one portion at the same intervals over 3 hours to the reaction system and subjected to reaction. In this case, the ethylene glycol produced as a by-product was distilled out together with unreacted ethylene carbonate. At this time, in the reactor, 1,386 g of copolymeric polycarbonate diol was produced, and the number average molecular weight thereof was 1,560 (hydroxyl value=71.9 mg·KOH/g). As a result of analysis, the ether unit in the product was 1.0 mole %. The reaction time required from the start of reaction to the completion of this step was 11 hours.

EXAMPLE 3

In a 3-liter reactor equipped with a stirrer, a thermometer and a fractionating column were placed 1,488 g (16.9 moles) of ethylene carbonate, 968 g (10.7 moles) of 1,4-butanediol, 544 g (4.6 moles) of 1,6-hexanediol and 30 mg of lead acetate and they were subjected to reaction at a temperature of 130° C. at a pressure of $2.0\times10^3$ Pa to $5.3\times10^3$ Pa (15 mmHg to 40 mmHg) for 10 hours. In this case, the ethylene glycol produced as a by-product and unreacted ethylene carbonate were distilled out of the top of the fractionating column, and in the cold trap, it was found that 2.2 mole % based on the 1,4-butanediol fed of tetrahydrofuran was produced. The number average molecular weight of the product in the reactor at this time was measured by GPC to find it to be about 380.

Subsequently, the pressure was returned to normal pressure, the fractionating column was removed to make direct evacuation possible, and thereafter, the temperature was adjusted to 140° C., at which unreacted diol was taken out at a pressure of $5.3\times10^2$ Pa to $8.0\times10^2$ Pa (4 mmHg to 6 mmHg) for 1.5 hours until the diol concentration in the reaction system became 0.6% by weight. Subsequently, the temperature was adjusted to 140° C. to 150° C., at which ethylene carbonate was continuously added to the reaction system at a rate of 100 g per hour at a pressure of $5.3\times10^2$ Pa to $1.3\times10^3$ Pa (4 mmHg to 10 mmHg) for 4 hours and subjected to reaction. In this case, the ethylene glycol produced as a by-product was distilled out together with unreacted ethylene carbonate. In the cold trap, THF was produced in a proportion of 1.3 mole % based on the 1,4-butanediol fed. At this time, in the reactor, 1,264 g of a copolymeric polycarbonate diol was produced, and the number average molecular weight thereof was 2,560 (hydroxyl value=43.8 mg·KOH/g). As a result of analysis, the ether unit in the product was 0.9 mole %. The total amount of THF produced as a by-product from the initial stage of the reaction was 3.5 mole % of the 1,4-butanediol fed. The reaction time required from the start of reaction to the completion of this step was 15.5 hours.

COMPARATIVE EXAMPLE 1

In a 3-liter reactor equipped with a stirrer, a thermometer and a fractionating column were placed 1,584 g (18 moles) of ethylene carbonate, 1,440 g (16 moles) of 1,4-butanediol and 30 mg of lead acetate and they were subjected to reaction at a temperature of 130° C. at a pressure of $2.3\times10^3$ Pa to $4.7\times10^3$ Pa (17 mmHg to 35 mmHg) for 10 hours. In this case, the ethylene glycol produced as a by-product and unreacted ethylene carbonate were distilled out of the top of the fractionating column, and in the cold trap, it was found that 2.4 mole % based on the 1,4-butanediol fed of tetrahydrofuran was produced. The number average molecular weight of the product in the reactor at this time was measured by GPC to find it to be about 400. Subsequently, the pressure was returned to normal pressure, the fractionating column was removed to make direct evacuation possible, and then, the temperature was adjusted to 140° C., at which unreacted diol was taken out at a pressure of $5.3\times10^2$ Pa to $8.0\times10^2$ Pa (4 mmHg to 6 mmHg) for 0.5 hour until the diol concentration in the reaction system became 10% by weight. Subsequently, the temperature was adjusted to 140° C. to 150° C., at which ethylene carbonate was continuously added to the reaction system at a rate of 100 g per hour at a pressure of $5.3\times10^2$ Pa to $1.3\times10^3$ Pa (4 mmHg to 10 mmHg) over 4 hours and subjected to reaction. The number average molecular weight of the product at this time was 820 (hydroxyl value=136.8 mg·KOH/g). Ethylene carbonate was further continuously added to the reaction system at a rate of 100 g per hour over 4 hours and subjected to reaction.

In this case, the ethylene glycol produced as a by-product was distilled out together with unreacted ethylene carbonate. In the cold trap, THF was produced in a proportion of 3.2 mole % based on the 1,4-butanediol fed. At this time, in the reactor, 1,286 g of polytetramethylene carbonate diol was produced, and the number average molecular weight thereof was 1,065 (hydroxyl value=105.4 mg·KOH/g). As a result of analysis, the ether unit in the product was 2.1 mole %. The total amount of THF produced as a by-product from the initial stage of the reaction was 5.6 mole % based on the 1,4-butanediol fed. The reaction time required from the start of reaction to the completion of this step was 18.5 hours.

COMPARATIVE EXAMPLE 2

In a 3-liter reactor equipped with a stirrer, a thermometer and a fractionating column were placed 1,593 g (18.1 moles) of ethylene carbonate, 1,481 g (16.5 moles) of 1,4-butanediol and 30 mg of lead acetate and they were subjected to reaction at a temperature of 130° C. at a pressure of $2.3\times10^3$ Pa to $4.7\times10^3$ Pa (17 mmHg to 35 mmHg) for 10 hours. In this case, the ethylene glycol produced as a by-product and unreacted ethylene carbonate were distilled out of the top of the fractionating column, and in the cold trap, it was found that 2.4 mole % based on the 1,4-butanediol fed of tetrahydrofuran was produced. The number average molecular weight of the product in the reactor at this time was measured by GPC to find it to be about 400. Subsequently, the pressure was returned to normal pressure, the fractionating column was removed to make direct evacuation possible, and then, the temperature was adjusted to 140° C., at which unreacted diol was taken out at a pressure of $5.3 \times 10^2$ Pa to $8.0 \times 10^2$ Pa (4 mmHg to 6 mmHg) for 1 hour until the diol concentration in the reaction system became 3% by weight. Subsequently, 400 g of ethylene carbonate was added in one portion, and thereafter, the temperature was adjusted to 140° C. to 150° C., at which the ethylene glycol produced as a by-product was distilled out together with unreacted ethylene carbonate while the degree of vacuum was gradually elevated from $3.3 \times 10^3$ Pa to $5.3 \times 10^2$ Pa (from 25 mmHg to 4 mmHg). When 2 hours passed from the start of the reaction, the distillation of ethylene carbonate became unobserved. At this time, the concentration of the ethylene carbonate in the reaction system was 0.6% by weight, and the number average molecular weight of the product was 680 (hydroxyl value=127.5). The reaction was further conducted for 4 hours while the ethylene glycol produced as a by-product was distilled out at a pressure of $5.3 \times 10^2$ Pa (4 mmHg). In the cold trap, THF was produced in a proportion of 2.6 mole % based on the 1,4-butanediol fed. The number average molecular weight of the product in the reactor was 995 (hydroxyl value=112.8 mg·KOH/g). As a result of analysis, the ether unit in the product was 2.6 mole %. The total amount of THF produced as a by-product from the initial stage of the reaction was 4.9 mole % based on the 1,4-butanediol fed. The reaction time required from the start of reaction to the completion of this step was 17 hours.

COMPARATIVE EXAMPLE 3

In a 3-liter reactor equipped with a stirrer, a thermometer and a fractionating column were placed 1,584 g (18 moles) of ethylene carbonate, 1,440 g (16 moles) of 1,4-butanediol and 30 mg of lead acetate and they were subjected to reaction at a temperature of 130° C. at a pressure of $2.3 \times 10^3$ Pa to $4.7 \times 10^3$ Pa (17 mmHg to 35 mmHg) for 10 hours. In this case, the ethylene glycol produced as a by-product and unreacted ethylene carbonate were distilled out of the top of the fractionating column, and in the cold trap, it was found that 2.5 mole % based on the 1,4-butanediol fed of tetrahydrofuran was produced. The number average molecular weight of the product in the reactor at this time was measured by GPC to find it to be about 400. Subsequently, the pressure was returned to normal pressure, the fractionating column was removed to make direct evacuation possible, and then, the temperature was adjusted to 140° C., at which unreacted diol and ethylene carbonate were taken out at a pressure of $5.3 \times 10^2$ Pa to $8.0 \times 10^2$ Pa (4 mmHg to 6 mmHg) for 1 hour until the diol concentration in the reaction system became 1.5% by weight or less. Subsequently, the temperature was elevated from 140° C. to 180° C., the degree of vacuum was gradually raised from $2.7 \times 10^3$ Pa (20 mm Hg) and reaction was effected for 4 hours while 1,4-butanediol was distilled out. However, the decomposition of the product was violent, the degree of vacuum did not rise, and the number average molecular weight of the product did not rise to higher than 850 as a result of measurement by GPC. Moreover, as a result of analysis, the ether unit in the product was 1.3 mole %. The amount of THF produced as a by-product at this time was 8.8 mole % based on the 1,4-butanediol fed. Incidentally, the total amount of THF produced as a by-product from the start of reaction was 11.3 mole % based on the 1,4-butanediol fed.

[FIELD OF UTILIZATION IN INDUSTRY]

According to this invention, there can be economically advantageously produced a polycarbonate having terminal hydroxyl groups which is useful as a starting material for polyurethane in an emulsion, a coating, a thermoplastic elastomer, a paint, an adhesive or the like.

We claim:
1. A process for producing a polycarbonate having terminal hydroxyl groups obtained by reacting an aliphatic polyol with a carbonate monomer selected from the group consisting of a dialkyl carbonate, a diaryl carbonate and an alkylene carbonate, which comprises a first step of producing a low molecular weight polycarbonate while removing alcohols produced as by-products from the reaction mixture containing said aliphatic polyol and said carbonate monomer and a second step of adding to the reaction mixture in the first step said carbonate monomer in portions or continuously under the conditions that the concentration of the aliphatic polyol in the reaction mixture in the first step is 5% by weight or less and subjecting the resulting mixture to reaction while removing the alcohols produced as by-products to connect the low molecular weight polycarbonates to one another through the carbonate monomer, thereby increasing the molecular weight.

2. The production process according to claim 1, wherein the concentration of the aliphatic polyol in the reaction mixture in the first step is adjusted to 1% by weight or less and the second step is carried out.

3. The production process according to claim 1, wherein the aliphatic polyol and the carbonate monomer are mixed in such a proportion that the mole ratio of the former to the latter becomes 1:10 to 10:1 and the first step is carried out.

4. The production process according to claim 1, wherein the aliphatic polyol and the carbonate monomer are mixed in such a proportion that the mole ratio of the former to the latter becomes 1:2 to 2:1 and the first step is carried out.

5. The production process according to claim 1, wherein the first step is carried out at a temperature of 80° to 200° C. at a pressure of $6.7 \times 10^2$ Pa (5 mmHg) to atmospheric pressure and the second step is carried out at a temperature of 100° to 200° C. at a pressure of 13 Pa to $2.7 \times 10^4$ Pa (0.1 to 200 mmHg).

6. The production process according to claim 1, wherein the first step is carried out at a temperature of 80° to 200° C. at a pressure of $6.7 \times 10^2$ Pa (5 mmHg) to atmospheric pressure and the second step is carried out at a temperature of 100° to 200° C. at a pressure of 13 Pa to $2.7 \times 10^3$ Pa (0.1 to 20 mmHg).

7. The production process according to claim 1, wherein the dialkyl carbonate is a dialkyl carbonate having 1 to 12 carbon atoms.

8. The production process according to claim 1, wherein the diaryl carbonate is a diaryl carbonate having 6 to 20 carbon atoms.

9. The production process according to claim 1, wherein the alkylene carbonate is an alkylene carbonates comprising a 5-membered to 7-membered ring.

10. The production process according to claim 1, wherein the aliphatic polyol is an aliphatic diol.

11. The production process according to claim 10, wherein the aliphatic diol consists of an alkylene glycol or a polyoxyalkylene glycol.

12. The production process according to claim 11, wherein the alkylene glycol has 3 to 20 carbon atoms in its main chain or the polyoxyalkylene glycol has 2 to 12 carbon atoms between oxygen atoms.

13. The production process according to claim 1, wherein the molecular chain length of the low molecular weight polycarbonate obtained in the first step is 2 to 10 units.

14. The production process according to claim 1, wherein the molecular weight of the polycarbonate having terminal hydroxyl groups obtained in the second step is 500 to 8,000.

15. The production process according to claim 1, wherein the concentration of the aliphatic polyol in the reaction mixture is adjusted to 5% by weight or less by removing the aliphatic polyol from the reaction mixture.

16. The production process according to claim 15, wherein the concentration of the aliphatic polyol in the reaction mixture is adjusted to 5% by weight or less by lowering the pressure to a reduced pressure of 13 Pa to $2.7 \times 10^3$ Pa (0.1 to 20 mmHg).

17. The production process according to claim 15, wherein the concentration of the aliphatic polyol in the reaction mixture is adjusted to 5% by weight or less by elevating the temperature to 100° to 200° C.

18. The production process according to claim 15, wherein the concentration of the aliphatic polyol in the reaction mixture is adjusted to 5% by weight or less by blowing an inert gas into the reaction mixture.

* * * * *